US012577454B2

(12) United States Patent
Wu et al.

(10) Patent No.: US 12,577,454 B2
(45) Date of Patent: Mar. 17, 2026

(54) PHOTOCHROMIC COMPOSITIONS

(71) Applicant: Nano and Advanced Materials Institute Limited, Hong Kong (HK)

(72) Inventors: Nathan Man-Wai Wu, Hong Kong (HK); Chi Ho Kwok, Hong Kong (HK); Chaau Yan Poon, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 584 days.

(21) Appl. No.: 17/992,924

(22) Filed: Nov. 22, 2022

(65) Prior Publication Data

US 2023/0159818 A1 May 25, 2023

Related U.S. Application Data

(60) Provisional application No. 63/358,234, filed on Jul. 5, 2022, provisional application No. 63/282,726, filed on Nov. 24, 2021.

(51) Int. Cl.
*C09K 9/02* (2006.01)
*C09D 11/033* (2014.01)
*C09D 11/037* (2014.01)

(52) U.S. Cl.
CPC .............. *C09K 9/02* (2013.01); *C09D 11/033* (2013.01); *C09D 11/037* (2013.01)

(58) Field of Classification Search
CPC ........ C09K 9/02; C09D 11/033; C09D 11/037
See application file for complete search history.

(56) References Cited

U.S. PATENT DOCUMENTS 5,879,592 A 3/1999 Kumar
6,248,264 B1 6/2001 Clarke et al.
(Continued)

FOREIGN PATENT DOCUMENTS

CN 102272114 A 12/2011
CN 105143397 A 12/2015
(Continued)

OTHER PUBLICATIONS

Jockusch et al. "Photochromism of 2H-Naphtho[1,2-b]pyrans: A Spectroscopic Investigation" J. Phys. Chem. A 2002, 106, 9236-9241.*
(Continued)

*Primary Examiner* — Robert S Walters, Jr.
(74) *Attorney, Agent, or Firm* — IDEA Intellectual Limited; Sam T. Yip

(57) ABSTRACT

A photochromic composition having at least one photochromic naphthopyran-based component with R' and R" groups selected from hydrogen, alkyl, fluorinated alkyl, alkenyl, alkynyl, alkylaryl, cycloalkyl, alkoxy, halogen, amine, carbonate ester, carboxylate, aryl, substituted aryl, heteroaryl, substituted heteroaryl or a heterocyclic group and Ar' and Ar" groups selected from unsubstituted or substituted cyclic five-membered or six-membered structures including benzene, pyridine, thiophene, furan, carbazole, triphenylamine, dibenzothiophene, dibenzofuran, fluorine, naphthalene, anthracene and pyrene. The photochromic composition is excitable under a visible light range to produce a color change. A second photochromic naphthopyran-based component with a different thermal decay rate constant (k) may further be included in the photochromic composition. The photochromic composition is incorporated into color-changing inks and polymers.

15 Claims, 17 Drawing Sheets
(2 of 17 Drawing Sheet(s) Filed in Color)

(56) References Cited

U.S. PATENT DOCUMENTS

| | | | | |
|---|---|---|---|---|
| 6,294,112 | B1 | 9/2001 | Clarke et al. | |
| 6,387,512 | B1 | 5/2002 | Clarke et al. | |
| 2005/0258408 | A1* | 11/2005 | Molock | G02B 1/04 252/586 |
| 2007/0138448 | A1* | 6/2007 | Chopra | G03C 1/73 252/582 |
| 2008/0195072 | A1* | 8/2008 | Warner | A61L 15/56 604/385.01 |
| 2012/0021144 | A1 | 1/2012 | Dai et al. | |
| 2012/0156521 | A1 | 6/2012 | He et al. | |
| 2020/0399287 | A1 | 12/2020 | Chow et al. | |

FOREIGN PATENT DOCUMENTS

| | | | |
|---|---|---|---|
| CN | 105670389 | A | 6/2016 |
| CN | 205467732 | U | 8/2016 |
| CN | 110746395 | A | 2/2020 |
| CN | 113227053 | A | 8/2021 |
| CN | 113227099 | A | 8/2021 |
| CN | 113227259 | A | 8/2021 |
| GB | 8821373 | | 9/1988 |
| JP | 2000327676 | A | 11/2000 |
| JP | 2005112772 | A | 4/2005 |
| KR | 20160000890 | A | 1/2016 |
| KR | 20160134949 | A | 11/2016 |
| WO | 2013086248 | A1 | 6/2013 |

OTHER PUBLICATIONS

1st Office Action of the corresponding China patent application No. 202310220778.2 mailed on Jan. 24, 2025.

1st Office Action of the corresponding China patent application No. 202211479831.2 mailed on Dec. 30, 2024.

2nd Office Action of the corresponding China patent application No. 202211479831.2 mailed on May 22, 2025.

Binbin Sun, Organic spirocyclic photochromic materials, Northwestern Polytechnical University Press, 2021.

3rd Office Action of the corresponding China patent application No. 202310220778.2 mailed on Aug. 12, 2025.

* cited by examiner

PHOTOCHROMIC COMPOSITIONS

CROSS-REFERENCE TO RELATED APPLICATION

The present application is related to U.S. Provisional Patent Application 63/282,726 filed 24 Nov. 2021 and U.S. Provisional Patent Application 63/358,234 filed 5 Jul. 2022. The disclosures of which are incorporated by reference herein.

FIELD OF THE INVENTION

The present invention relates to the field of photochromic compositions and, more particularly, to photochromic compositions with improved thermal stability, photo-stability and well-defined photoinduced color changes that include one or two photochromic compounds.

BACKGROUND

Photochromism is the reversible transformation of a compound/molecule between two forms, A and B, with different absorption spectra, activated by absorption of radiation of a certain range of wavelengths. Using photochromic compounds, a material may exhibit a change in color, for example, upon exposure to sunlight. In the absence of the source of exposure, the material will return to its original color or transparent state. Photochromic materials are frequently used in eyeglasses in order to provide colored lenses in the presence of strong sunlight. Typically, articles incorporating photochromic materials show only a single-color change.

However, photochromic compounds may be thermally unstable. As a result, these compounds may decompose or lose their photochromic capabilities upon long term elevated-temperature exposure. For example, a series of compounds termed "VIP-1" used in photochromic inks is disclosed in US 2020/0399287 A1. The color-changing ability of the VIP-1 materials is found to decline down to below 20% of the active species at 60° C. over 150 hours. Moreover, various commercial photochromic materials demonstrate serious thermal decomposition at 60° C. in only 90 hours In view of the disadvantages of the existing photochromic compounds in photochromic articles, there is a need for photochromic compounds which show improved thermal stability and improved photo-stability, along with the ability to produce a variety of colors and more than one color change. Such new photochromic compounds could be used in printing inks for security and anti-counterfeit measures as well as lenses, toys, and decorative articles. The present invention addresses this need.

SUMMARY OF THE INVENTION

The present invention provides a photochromic composition including a first naphthopyran-based compound having the following formula (A):

(A)

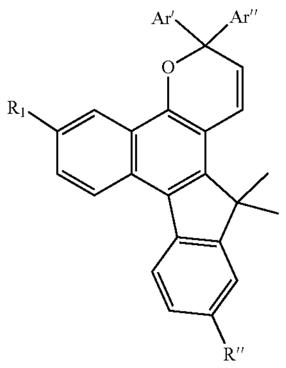

R' and R" are selected from hydrogen, alkyl, fluorinated alkyl, alkenyl, alkynyl, alkylaryl, cycloalkyl, alkoxy, halogen, amine, carbonate ester, carboxylate, aryl, substituted aryl, heteroaryl, substituted heteroaryl or a heterocyclic group.

Ar' and Ar" are unsubstituted or substituted cyclic five-membered or six-membered structures including benzene, pyridine, thiophene, furan, carbazole, triphenylamine, dibenzothiophene, dibenzofuran, fluorine, naphthalene, anthracene and pyrene.

The photochromic composition is excitable under a visible light range to produce a color change.

R' and R" may be electron withdrawing groups selected from fluoro, trifluoromethyl, nitro, cyano or sulfonyl groups.

R' and R" may be electron donating groups selected from methoxyl, dimethylamino or diphenylamino groups.

The visible light may have an intensity of approximately 200 W/m$^2$ or greater at a wavelength of approximately 300-450 nm.

The first naphthopyran compound may be one of the following formulae:

Nap2d

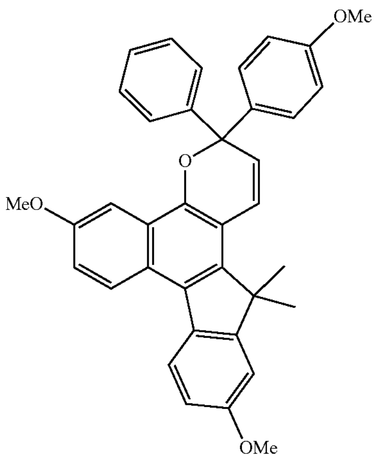

-continued

Nap5a

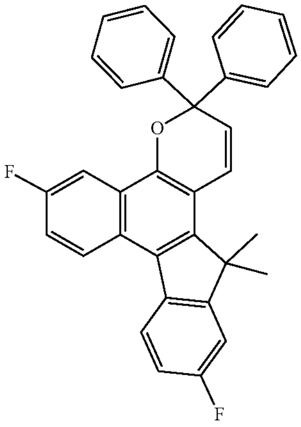

Nap5b

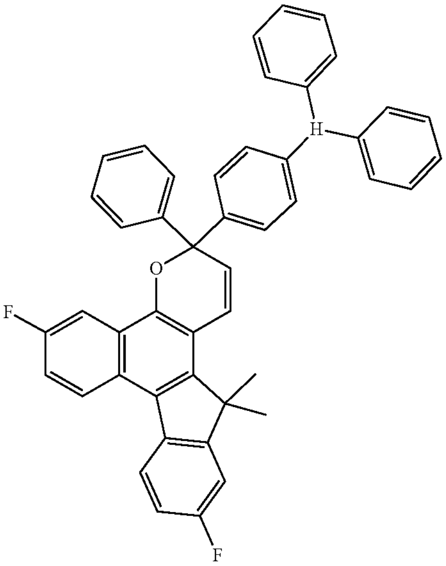

Nap6a

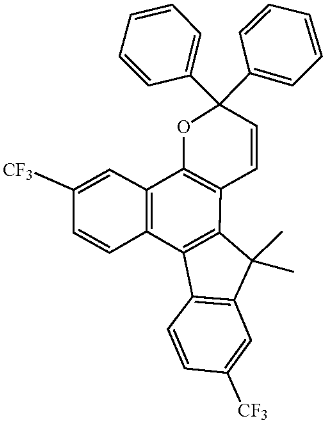

The photochromic composition may further include a second naphthopyran compound having a different excitation wavelength and a different thermal decay rate constant (k) than the first naphthopyran compound, the second naphthopyran compound having the following formula B:

(B)

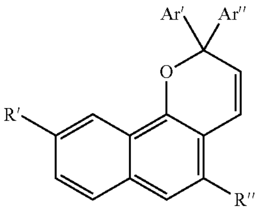

R' and R" are selected from hydrogen, alkyl, fluorinated alkyl, alkenyl, alkynyl, alkylaryl, cycloalkyl, alkoxy, halogen, amine, carbonate ester, carboxylate, aryl, substituted aryl, heteroaryl, substituted heteroaryl or a heterocyclic group.

Ar' and Ar" are unsubstituted or substituted cyclic five-membered or six-membered structures including benzene, pyridine, thiophene, furan, carbazole, triphenylamine, dibenzothiophene, dibenzofuran, fluorine, naphthalene, anthracene and pyrene The photochromic composition is excitable under a UV light to produce a color change.

A ratio by weight percent between the compound of formula A and the compound of formula B ranges from 1:9 to 9:1.

In one aspect, the second compound of formula B is:

Nap1

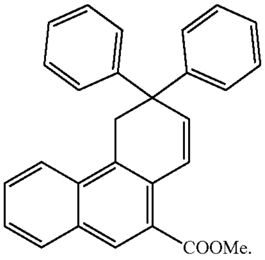

and the first compound of formula A is selected from

Nap2d

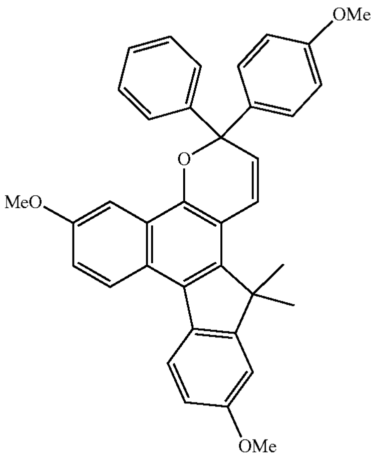

-continued

Nap5a

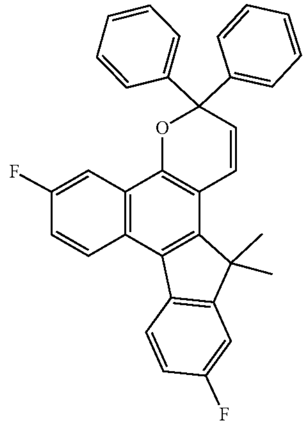

Nap5b

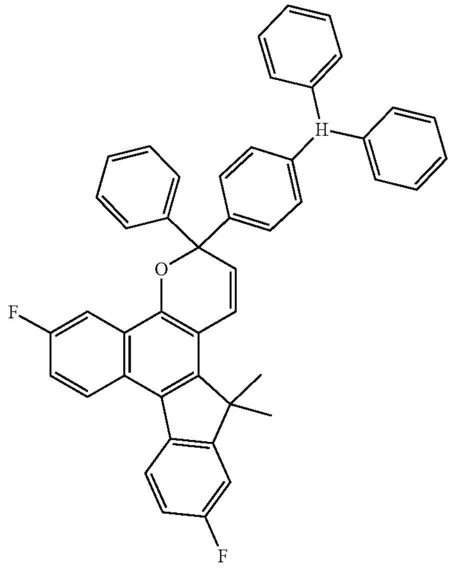

Nap6a

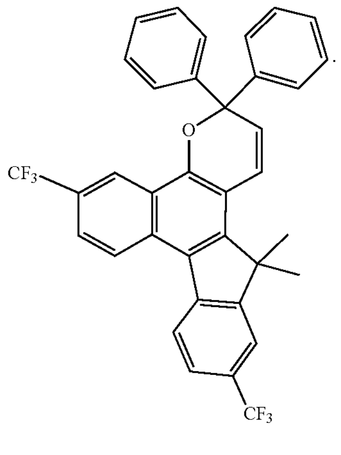

A photochromic printing ink may be formed using the above compositions. The ink may be an offset ink, screen printing ink or inkjet printing ink. The photochromic composition with one photochromic compound is included in an amount of approximately 0.1 to 15 weight percent. One or more polymers/resins are included in an amount of approximately 3 to 50 weight percent. One or more additives may optionally be included in an amount from approximately 0 to 8 weight percent. A solvent is present in an amount of approximately 50 to 96.5 weight percent.

In another aspect, a photochromic printing ink selected from an offset ink, screen printing ink or inkjet printing ink, that includes a photochromic composition with two photochromic compounds, each one in an amount of approximately 0.5 to 20 weight percent. One or more polymers/resins are included in an amount of approximately 3 to 50 weight percent. One or more additives are included in an amount from approximately 0 to 8 weight percent along with a solvent in an amount of approximately 50 to 96.5 weight percent.

In the photochromic printing inks, the polymers/resins may be one or more of cellulose, starch, rubber, shellac, rosin modified phenolic resin.

In the photochromic printing inks, the one or more additives may be one or more of waxes, dispersing powder, calcium carbonate, glycerol, ethoxylated or propoxylated fatty alcohols.

In the photochromic printing inks the solvent may be one or more of dichloromethane, esters, ketones, soybean oil, mineral oil, tung oil or linseed oil.

A photochromic polymeric material includes a photochromic composition with one or two photochromic compounds. The polymer may be one or more of polyethylene, polypropylene, polystyrene, polyvinyl chloride, polyamides, polyethylene terephthalate, polytetrafluoroethylene, poly(methyl methacrylate), polyphenylene sulfide, and polyether ether ketone, or rosin-modified phenolic resin.

BRIEF DESCRIPTION OF THE DRAWINGS

The patent application file contains at least one drawing executed in color. Copies of this patent application publication with color drawings will be provided by the Office upon request and payment of the necessary fee.

Embodiments of the present invention are described in more detail hereinafter with reference to the drawings, in which.

DEFINITIONS

Alkyl

Figure 1A:
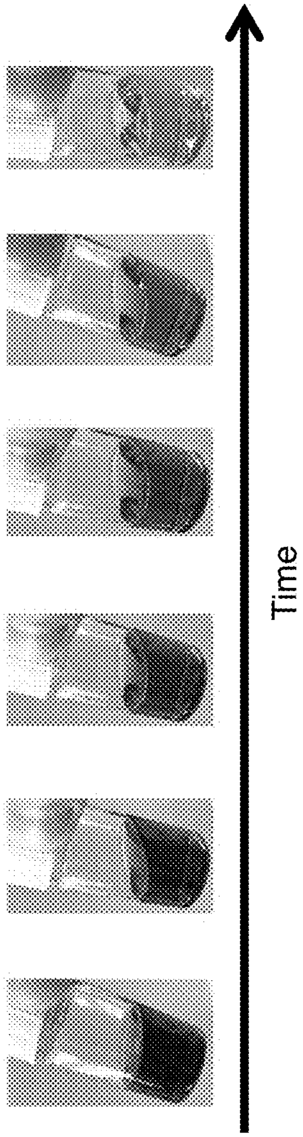
FIGS. 1A-1B show time-dependent multiple color-changing effect of mixed photochromic naphthopyrans in solution.

The term "alkyl" as used herein includes reference to an unbranched or branched chain alkyl moiety having 1, 2, 3, 4, 5, 6, 7, 8, 9, 10, 11, 12, 13, 14, 15, 16, 17, 18, 19 or 20 carbon atoms.

Alkoxy

The terms "alkoxy" as used herein include reference to —O-alkyl, wherein alkyl is unbranched or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert- butoxy, pentoxy, hexoxy and the like.

Aryl

The term "aryl" as used herein includes reference to an aromatic ring system comprising 6, 7, 8, 9, 10, 11, 12, 13, 14, 15 or 16 ring carbon atoms. Aryl is often phenyl but may be a polycyclic ring system, having two or more rings, at least one of which is aromatic. This term includes reference to groups such as phenyl, naphthyl, fluorenyl, azulenyl, indenyl, anthryl and the like.

Heteroaryl

The term "heteroaryl" as used herein includes reference to an aromatic heterocyclic ring system having 5, 6, 7, 8, 9, 10, 11, 12, 13, 14, 15 or 16 ring atoms, at least one of which is selected from nitrogen, oxygen and sulphur. The group may be a polycyclic ring system, having two or more rings, at least one of which is aromatic, but is more often monocyclic. The ring or ring system may be substituted with one or more hydrocarbyl groups. This term includes reference to groups such as pyrimidinyl, furanyl, benzo[b]thiophenyl, thiophenyl, pyrrolyl, imidazolyl, pyrrolidinyl, pyridinyl, benzo[b]furanyl, pyrazinyl, purinyl, indolyl, benzimidazolyl, quinolinyl, phenothiazinyl, triazinyl, phthalazinyl, 2H-chromenyl, oxazolyl, isoxazolyl, thiazolyl, isoindolyl, indazolyl, purinyl, isoquinolinyl, quinazolinyl, pteridinyl and the like.

Halogen

The term "halogen" as used herein includes F, Cl, Br or I.

DETAILED DESCRIPTION

The present invention provides compositions that include one or more photochromic naphthopyran-based compound (s). Compositions that include a single compound have a single thermal decay rate constant while compositions with two compounds have two different thermal decay rate constants. The compositions are employed in a variety of inks and polymers to provide color-changing properties.

A first aspect of the present invention provides a photochromic naphthopyran-based compound having the following formula (A):

(A)

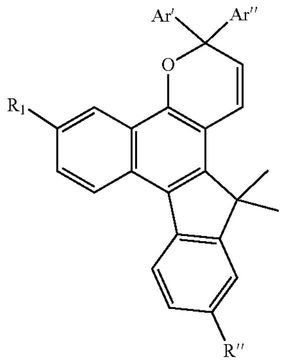

wherein R' and R" are selected from hydrogen, alkyl, fluorinated alkyl, alkenyl, alkynyl, alkylaryl, cycloalkyl, alkoxy, halogen, amine, carbonate ester, carboxylate, aryl, substituted aryl, heteroaryl, substituted heteroaryl or a heterocyclic group, and wherein the group contains 1 to 25 carbon atoms; Ar' and Ar" are unsubstituted or substituted cyclic five-membered or six-membered structures including benzene, pyridine, thiophene, furan, carbazole, triphenylamine, dibenzothiophene, dibenzofuran, fluorine, naphthalene, anthracene and pyrene. In addition, R' and R" are able to be different substituents. The photochromic naphthopyran compound, upon exposure to a visible light range, e.g., under an intensity of approximately 200 $W/m^2$ or greater and at a wavelength of approximately 300-450 nm, is excited to produce a color change.

R' and R" may be electron withdrawing groups selected from fluoro, trifluoromethyl, nitro, cyano or sulfonyl groups, and the compound displays color decomposition of less than 10% at 60° C. over 1000 hours of aging.

R' and R" may be electron donating groups, selected from methoxyl, dimethylamino or diphenylamino groups, and the compound displays color decomposition of less than 40% at 60° C. over 500 hours of aging.

R' and R" may be electron withdrawing groups, selected from fluoro, trifluoromethyl, nitro, cyano or sulfonyl groups, and the compound displays color decomposition of less than 20% over 500 photo-switching cycles.

R' and R" may be electron donating groups selected from methoxyl, dimethylamino or diphenylamino groups, and the compound displays color decomposition of less than 40% over 500 photo-switching cycles.

The photochromic naphthopyran compound of Formula A may be one of the following formulae:

Nap2d

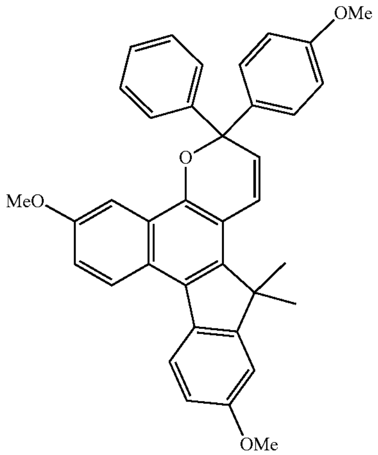

Nap5a

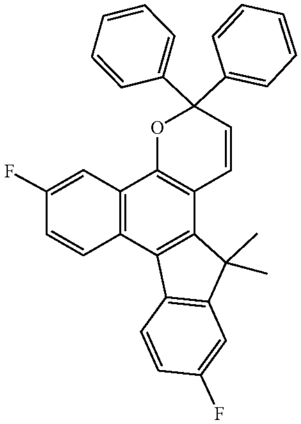

Nap5b

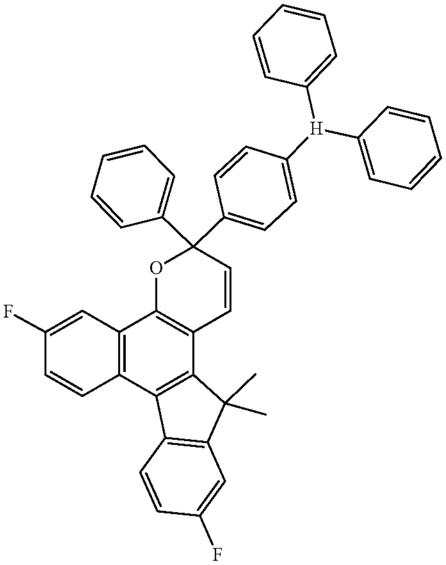

-continued

Nap6a

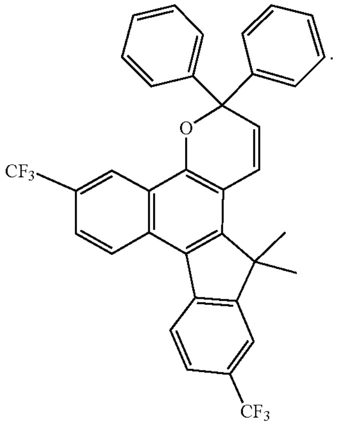

A photochromic printing ink may be made from the photochromic composition. The ink may be an offset printing ink, screen printing ink, or inkjet printing ink. The composition including formula (A) is included in an amount of 0.1 to 15 weight percent; one or more polymers/resins is included in an amount of approximately 0 to 50 weight percent; one or more additives in an amount from approximately 0 to 8 weight percent; and a solvent in an amount of approximately 50 to 99.9 weight percent.

In a particular ink, the photochromic naphthopyran compound of Formula A is included in the ink composition is in an amount of approximately 0.5 to 15 weight percent, and the ink composition further includes the additives in an amount of approximately 0.5 to 5 weight percent selected from one or more of waxes, dispersing powder, calcium carbonate; the solvent in an amount of approximately 50 to 70% weight percent selected from one or more of dichloromethane, esters, ketones, soybean oil, mineral oil, tung oil and linseed oil; the one or more resins selected from resin or rosin modified phenolic resin, in an amount of 30 to 50%.

In another ink composition, the photochromic naphthopyran compound in the screen printing ink composition is included in an amount of approximately 0.1 to 3 weight percent, and the screen-printing ink further includes the solvent in an amount of approximately 50 to 70% weight percent selected from one or more of cyclohexanone, xylene and tung oil; the one or more resins are selected from synthetic resins such as phenolic resins in an amount of 30 to 50%.

In another ink composition, the photochromic naphthopyran compound of Formula A is included is in an amount of approximately 0.1 to 6 weight percent, and the ink composition further includes the solvent in an amount of approximately 94 to 99.9% weight percent selected from one or more of ethyl acetate, 2-butanone and diethylene glycol monoethyl ether acetate.

In another aspect, the present invention provides a photochromic composition that has two or more photochromic naphthopyran-based components with different thermal decay rate constants (k). By using multiple naphthopyran-based components, a controlled time and color may be engineered in a product such as an ink or polymeric article such as a thin film or solid polymer article. In particular, a gradual color-changing effect may be realized using the photochromic compositions of the present invention. Typical solid articles include windows, lenses, and optical filters which may be formed by incorporating the photochromic composition or by coating using a thin film or ink including the photochromic composition. Further applications include novelty items, toys, and decorative articles that exhibit color changing properties.

The photochromic composition includes a first component selected from formula A and a second component selected from formula B, below:

(A)

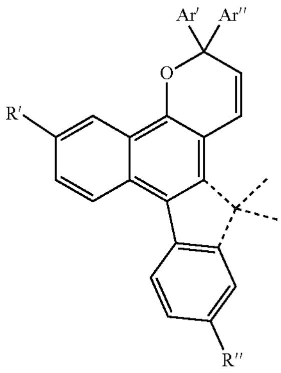

(B)

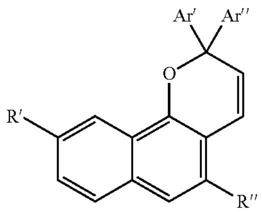

In formulae A and B, R' and R" are selected from hydrogen, alkyl, fluorinated alkyl, alkenyl, alkynyl, alkylaryl, cycloalkyl, alkoxy, halogen, amine, carbonate ester, carboxylate, aryl, substituted aryl, heteroaryl, substituted heteroaryl or a heterocyclic group.

Ar' and Ar" are unsubstituted or substituted cyclic five-membered or six-membered structures including benzene, pyridine, thiophene, furan, carbazole, triphenylamine, dibenzothiophene, dibenzofuran, fluorine, naphthalene, anthracene and pyrene.

The thermal decay rate constant ($k_A$) of the first component of formula A is typically smaller than $1\times10^{-2}$ $s^{-1}$ at room temperature while the thermal decay rate constant ($k_B$) of the second component of formula B is larger than $1\times10^{-2}$ $s^{-1}$ at room temperature.

Importantly, the compounds of both formula A and formula B demonstrate a high degree of thermal stability. That is, the compounds of formula A and formula B continue to exhibit photochromic properties despite prolonged exposure to elevated temperature or repeated cycles of excitation by radiation/visible light. Depending upon the selected substituents, the deterioration of photochromic properties is as low as 10 percent when exposed to temperatures of 60° C. for as much as 500 hours.

For example, when R' and R" are electron withdrawing groups selected from fluoro, trifluoromethyl, nitro, cyano or sulfonyl groups, the composition demonstrates color decomposition of less than 10% at 60° C. over 500 hours of aging.

In another aspect, when R' and R" are electron donating groups selected from methoxyl, dimethylamino or diphenylamino groups, the composition demonstrates color decomposition of less than 40% at 60° C. over 500 hours of aging.

When R' and R" are electron withdrawing groups selected from fluoro, trifluoromethyl, nitro, cyano or sulfonyl groups, the composition demonstrates color decomposition of less than 20% over 500 photo-switching cycles.

When R' and R" are electron donating groups selected from methoxyl, dimethylamino or diphenylamino groups, the composition demonstrates color decomposition of less than 40% over 500 photo-switching cycles.

The ratio by weight percent between the first component selected from formula A and the second component selected from formula B ranges from 1:9 to 9:1 in the photochromic composition. Particular ratios are determined by the selected colors and wavelengths that are desired to be exhibited in the final product that uses the composition.

The photochromic composition is typically excitable by visible light with an intensity of approximately 200 $W/m^2$ or greater at a wavelength of approximately 300-450 nm.

Particular compositions of the photochromic materials include a compound according to formula B as shown below:

Nap1

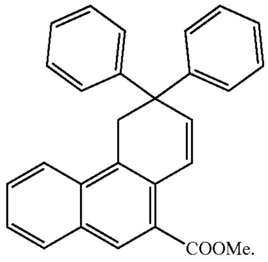

Examples of compounds for formula A are shown in the following formulae:

Nap2d

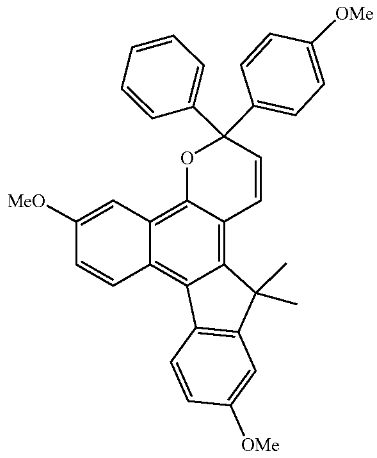

-continued

Nap3

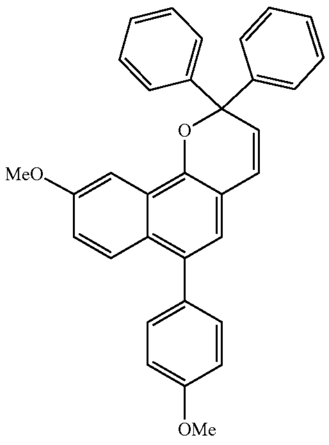

Nap5a

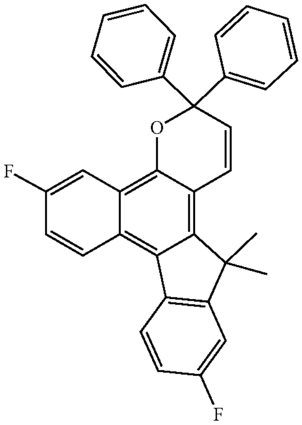

Nap5b

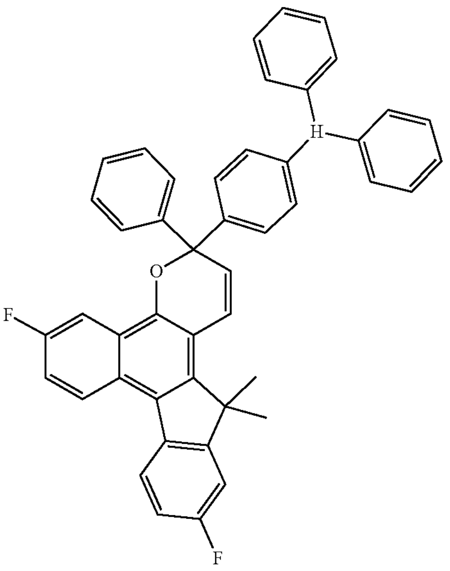

Table 1 shows the absorption and thermal decay properties of these compounds at room temperature when incorporated into an ethyl acetate polymer:

TABLE 1

| Compound | Absorption maximum of the colored open form ($\lambda_{max}$) | Thermal decay rate constants (k) | Half-life ($t_{1/2}$) |
|---|---|---|---|
| Nap1 | 450 nm | $-4.0 \times 10^{-2}\ s^{-1}$ | 17 s |
| Nap2d | 580 nm | $-3.4 \times 10^{-3}\ s^{-1}$ | 200 s |
| Nap3 | 500 nm | $-1.4 \times 10^{-3}\ s^{-1}$ | 500 s |
| Nap5a | 540 nm | $-3.1 \times 10^{-3}\ s^{-1}$ | 220 s |
| Nap5b | 590 nm | $-8.1 \times 10^{-3}\ s^{-1}$ | 86 s |

The compositions of the present invention may be used in a large number of applications. In one aspect, the composition is used as a part of a photochromic ink. There are a number of types of photochromic inks that may include the photochromic composition such as offset inks, screen printing inks, and inkjet printing inks. These different types of inks have different requirements in terms of selected solvents, polymers, and additives, depending upon the required properties for the ink such as viscosity, desired thickness of the deposited ink, resolution, etc. In general, the photochromic composition is used in the ink in an amount of approximately 0.5 to 20 weight percent.

The ink further includes one or more polymers/resins in an amount of approximately 3 to 30 weight percent, one or more additives in an amount from approximately 0 to 8 weight percent; and a solvent in an amount of approximately 70 to 96.5 weight percent.

Figure 10:
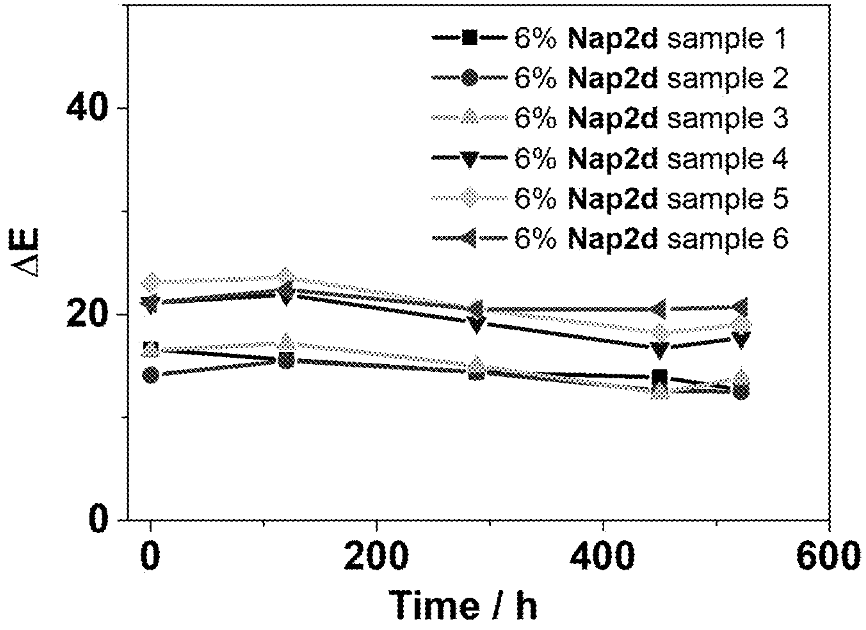
FIG. 10 illustrates the thermal stability of the offset printouts of 6% Nap2d in printing ink at 60° C. over 500 hours.
Figure 11A:
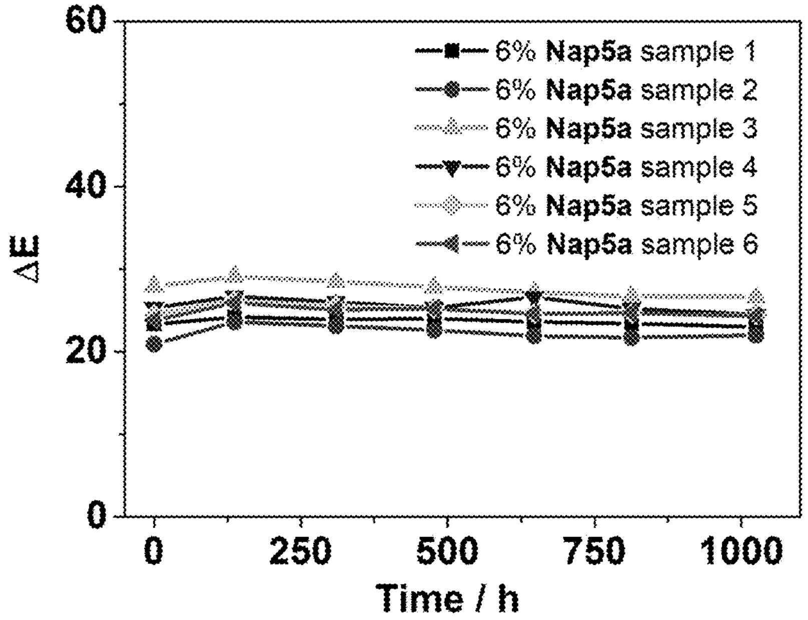
FIG. 11A-11B illustrates the thermal stability of the offset printouts of 6% Nap5a (FIG. 11A) and 6% Nap5b (FIG. 11B) in printing ink at 60° C. over 1000 hours.
Figure 11B:
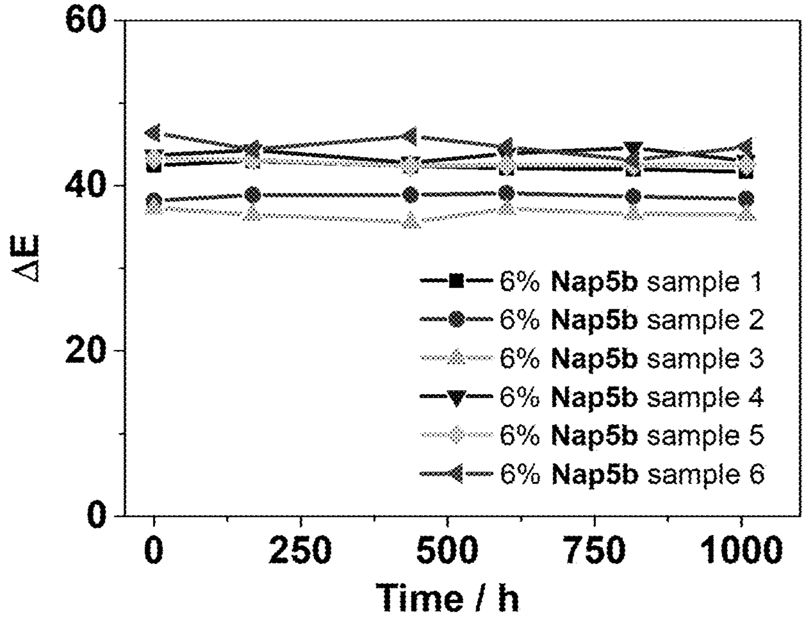

FIG. 10 shows the thermal stability of the present compound with three methoxyl substitutes as electron-donating groups (R'═R"=Ar"═OMe and Ar'=Ph for Nap2d) in the second embodiment. Nap2d is found to display color decomposition of less than 40% at 60 ° C. over 500 hours aging. In addition, FIG. 11 shows the thermal stability of the present compound with two substitutes as electron-withdrawing groups (R'═R"═F and Ar'═Ar"═Ph for Nap5a; R'═R"═F, Ar'═Ph and Ar"═PhNPh2 for Nap5b) in the first embodiment. Nap5a and Nap5b are, however, shown to have an improved thermal stability of less than 10% of color decomposition at 60° C. over 1000 hours aging.

Figure 7A:
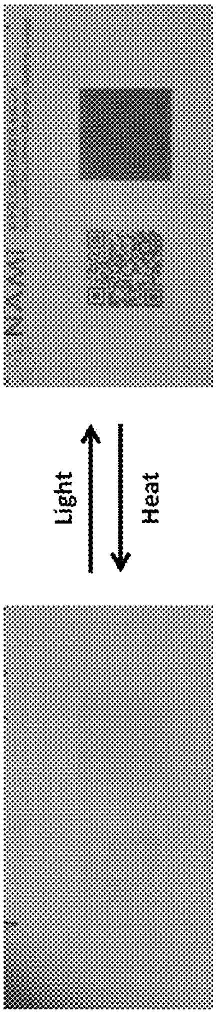
FIG. 7A-7C illustrates the photo-induced color changes of 6% Nap2d (FIG. 7A), 6% Nap5a (FIG. 7B) and 6% Nap5b (FIG. 7C) in offset printouts.
Figure 7B:
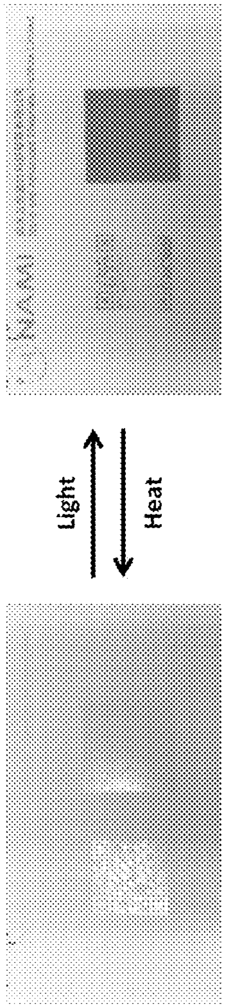
Figure 7C:
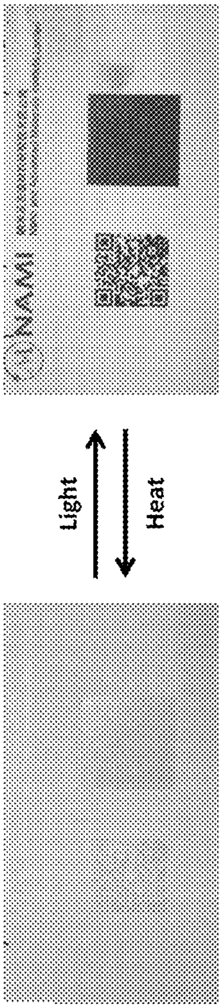
Figure 8A:
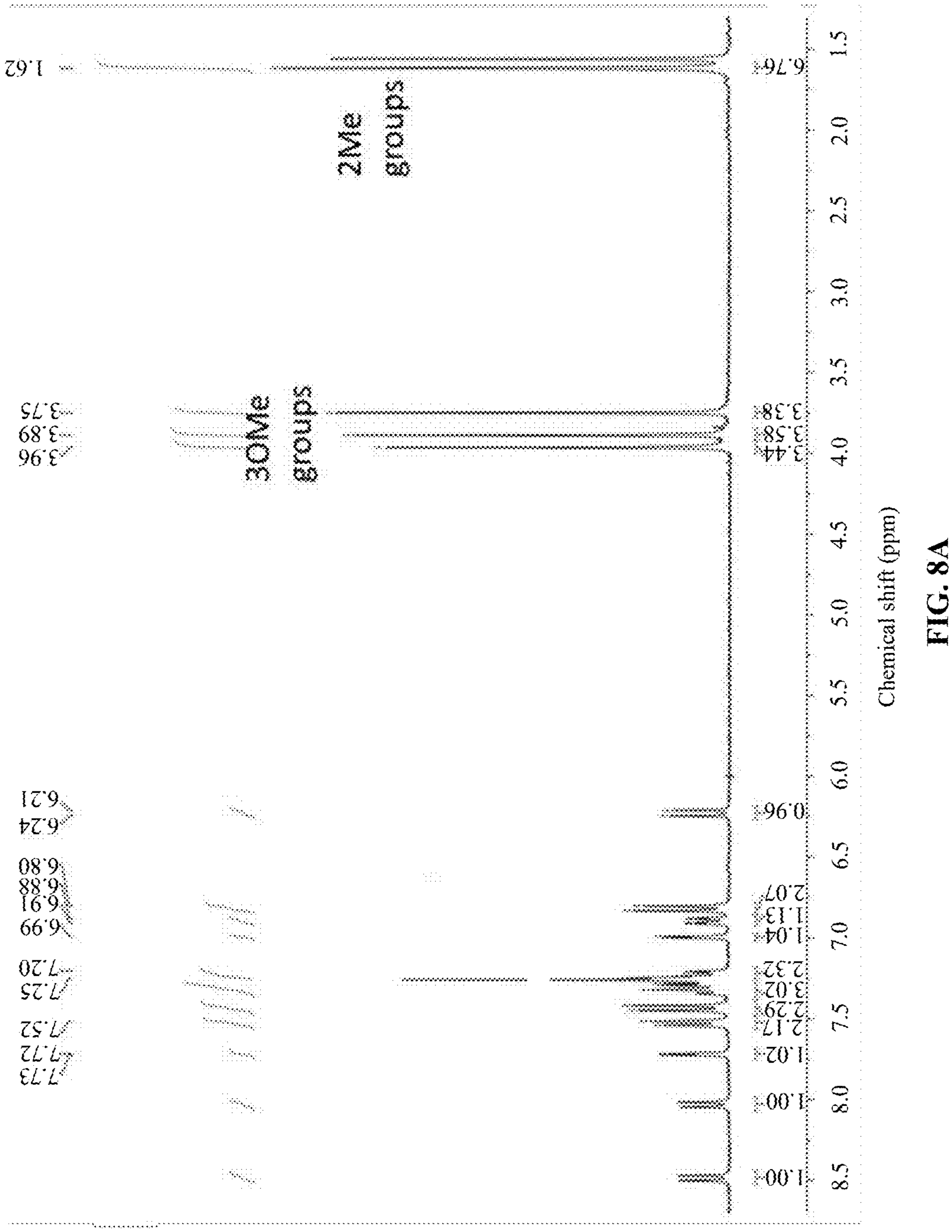
FIG. 8A-8C illustrate the 1H NMR spectra of Nap2d (FIG. 8A), Nap5a (FIG. 8B) and Nap5b (FIG. 8C) in CDCl3 at room temperature.
Figure 8B:
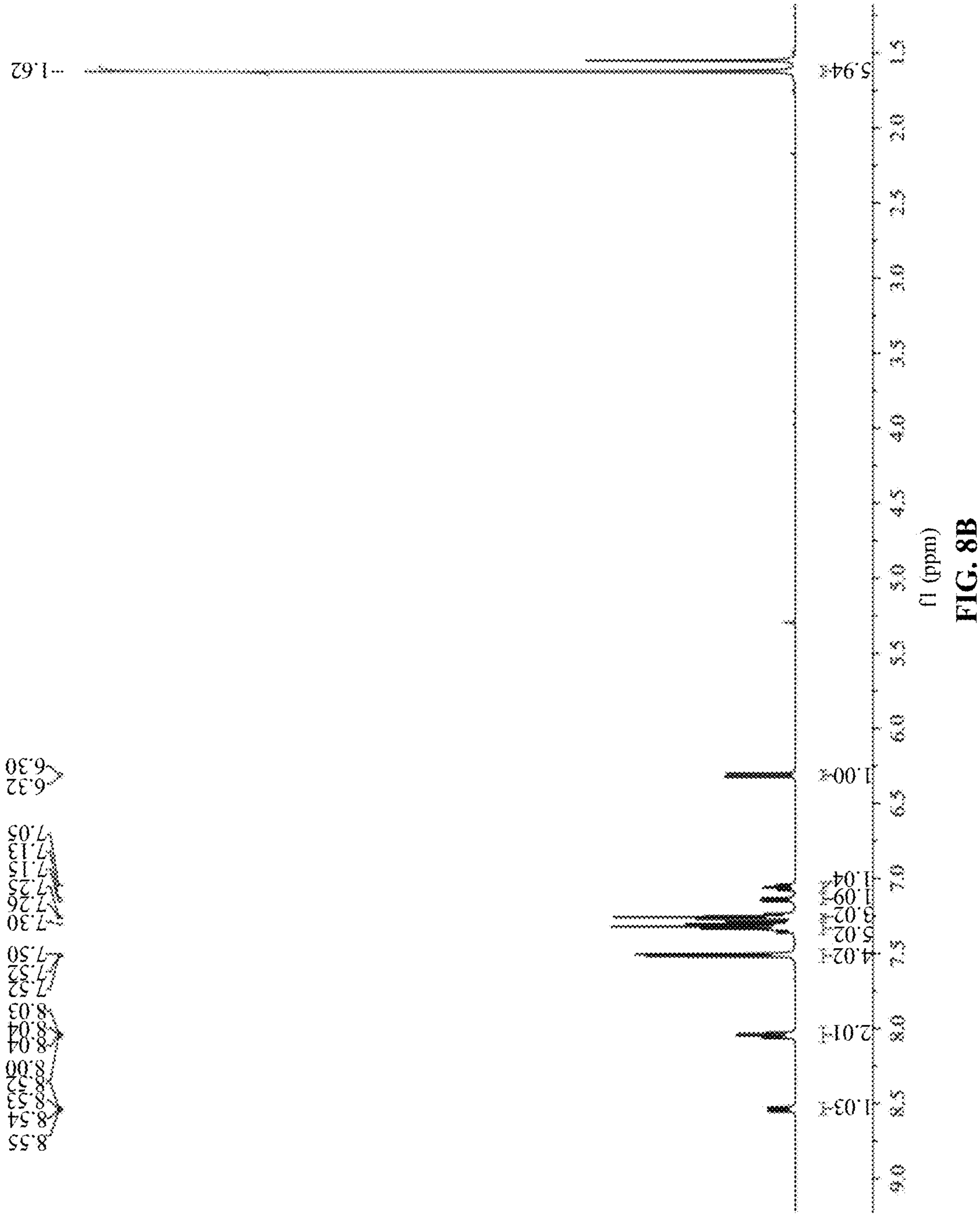
Figure 8C:
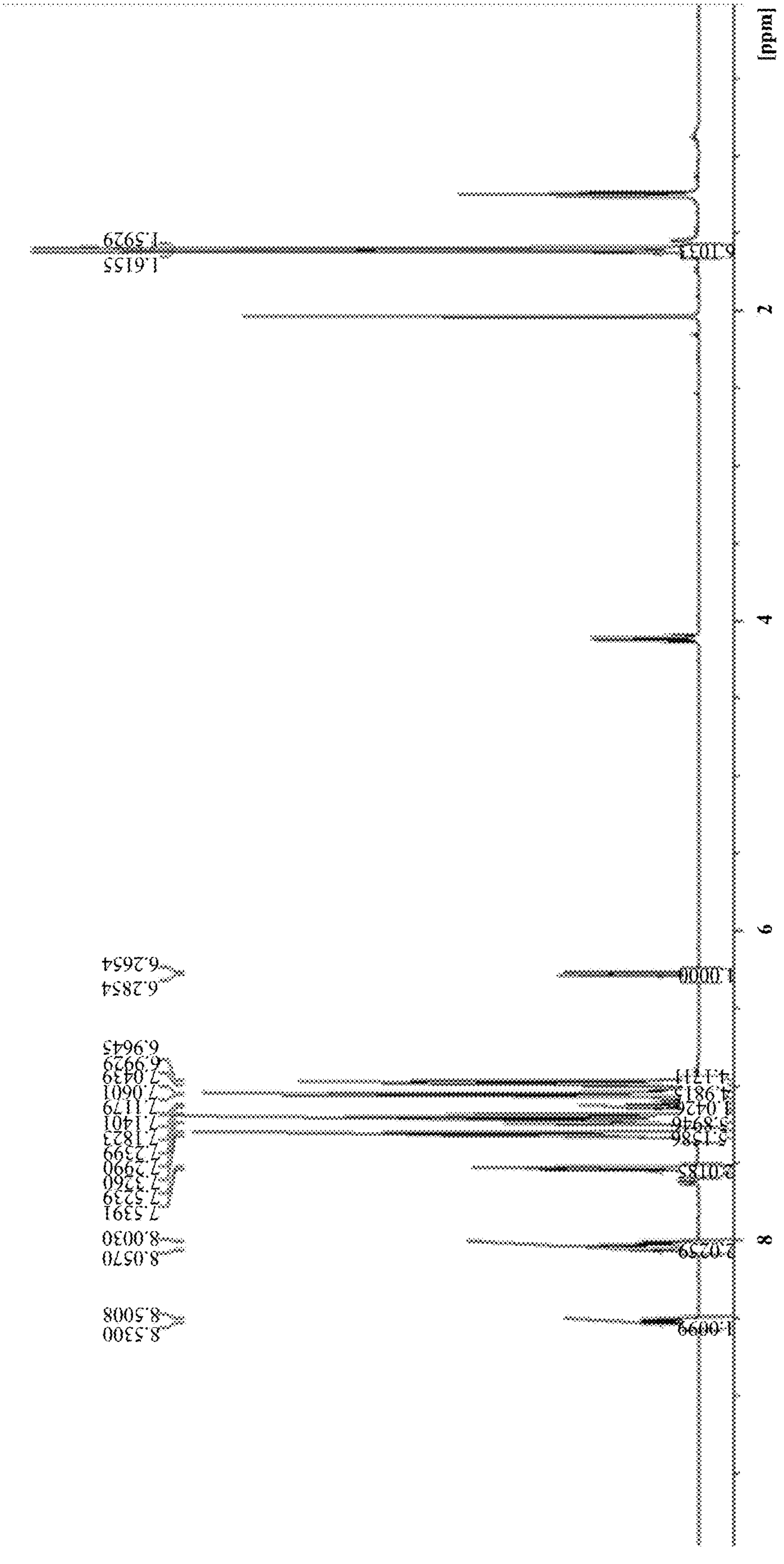
Figure 9A:
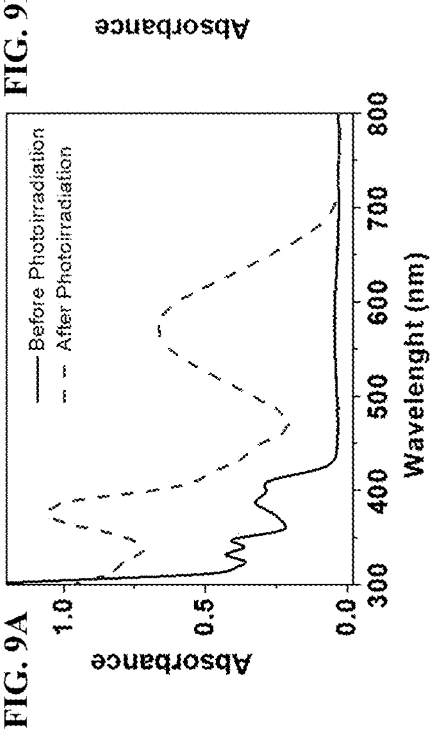
FIG. 9A-9C illustrates the photo-induced color changes of Nap2d (FIG. 9A), Nap5a (FIG. 9B) and Nap5b (FIG. 9C) in ethyl acetate with the concertation at 6.4x10-5 M, monitored by the UV-vis absorption spectral changes.
Figure 9B:
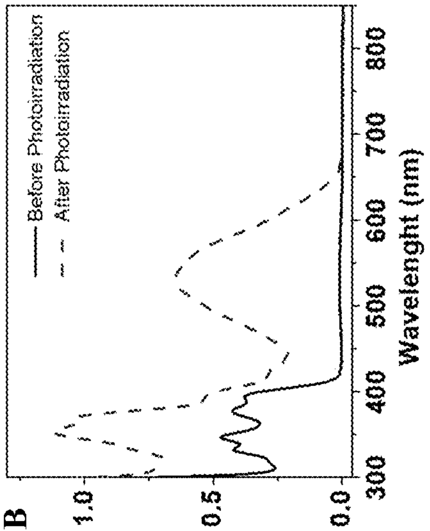
Figure 9C:
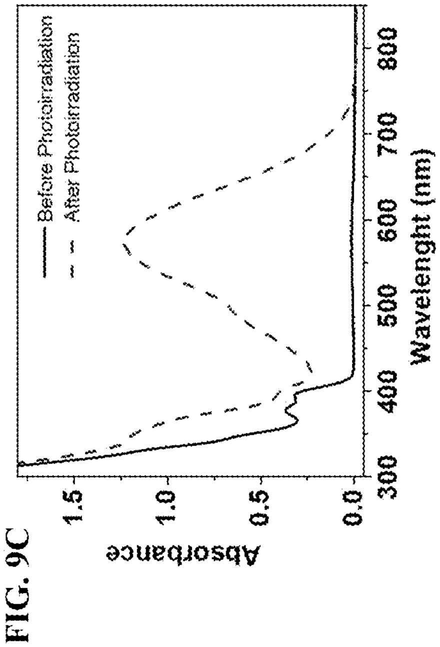

The printouts that were produced by the offset printing ink composition display photo-induced color changes, see FIG. 7(*a*)-(*c*). Moreover, the chemical structure and the photochromic property of naphthopyran-based compounds in the present invention, are characterized by the $^{1}H$ spectra, see FIG. 11(*a*)-(*c*), and UV-vis absorption spectral changes (FIG. 9(*a*)-(*c*) and Table 2). In addition, the photochromic naphthopyran compound according to the first and third embodiments of the present invention with R' and R" as the electronic withdrawing groups selected from fluorine has an improved thermal stability (FIGS. 5, 6, and 10-12), improved photo-stability (FIG. 13), and exhibits drastic photo-induced color changes (FIGS. 7(*a*)-(*c*), 9, 10, 11 and 13).

The fifth embodiment provides four specific formulae of the present compound, and their characterization is summarized in Table 2.

The sixth to eighth embodiments and corresponding examples described hereinafter provide different photochromic printing ink compositions including different concentrations of the present compounds and one or more of the following components: polymer/resin, additive and solvent, for use in various printing methods including offset, screen and inkjet printings.

TABLE 2

Photophysical data of naphthopyran-based compounds in ethyl acetate at room temperature

| Compound | Configuration | Absorption $\lambda_{max}$ (nm) ($\varepsilon$/$dm^3mol^{-1}cm^{-1}$) |
|---|---|---|
| Nap2d | Closed Form | 280 (35000), 297 (34000), 332 (11000), 347 (10000), 387 (8100), 406 (7300) |
| | Open Form | 375 (–), 570 (–) |
| Nap5a | Closed Form | 281 (35000), 292 (39000), 332 (6600), 347 (7300), 377 (6700), 393 (6000) |
| | Open Form | 353 (–), 370 (–), 530 (–) |
| Nap5b | Closed Form | 291 (48000), 377 (5700), 395 (5000) |
| | Open Form | 575 (–) |
| Nap6a | Closed Form | 282 (33000), 292 (36000), 367 (9900) |
| | Open Form | 520 (–) |

The extinction coefficient ($\varepsilon$) of the photogenerated open form cannot be obtained due to the thermal backward reaction, which would lead to undetermined conversion at the photo stationary state (PSS).

The one or more polymers/resins may be selected from cellulose, starch, rubber, shellac, rosin modified phenolic resin. The one or more additives is/are selected from waxes, dispersing powder, calcium carbonate, glycerol, ethoxylated or propoxylated fatty alcohols. The solvent may be selected from one or more of dichloromethane, esters, ketones, soybean oil, mineral oil, tung oil, linseed oil, hexane, toluene, xylene, dichloromethane, chloroform, dichlorobenzene, esters, ketones, and water.

The photochromic composition may also be incorporated into a polymeric material that includes the photochromic composition. The photochromic polymeric material may include one or more polymers selected from polyethylene, polypropylene, polystyrene, polyvinyl chloride, polyamides, polyethylene terephthalate, polytetrafluoroethylene, poly(methyl methacrylate), polyphenylene sulfide, and polyether ether ketone, or rosin-modified phenolic resin. Photochromic polymer articles can be formed through conventional polymer processing such as extrusion, molding, casting, etc.

Various arbitrary selection of color changes may be obtained through the mixing of the two photochromic compounds with different half-lives or different ratios, described above. FIG. 1 depicts color changes as a function of time.

Figure 1B:
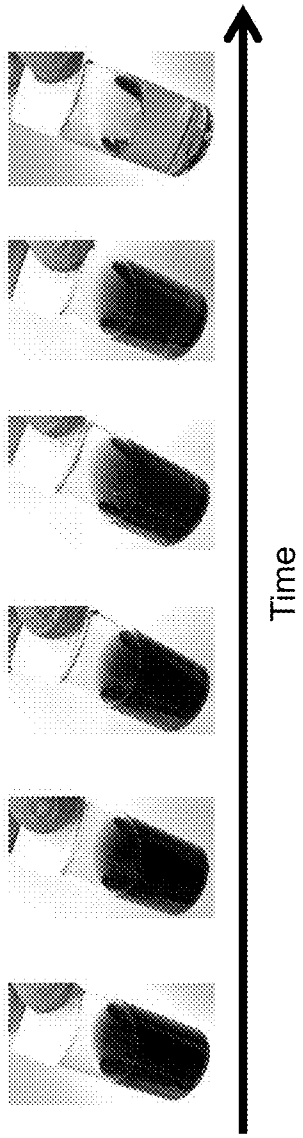
Figures 2A, 2B:
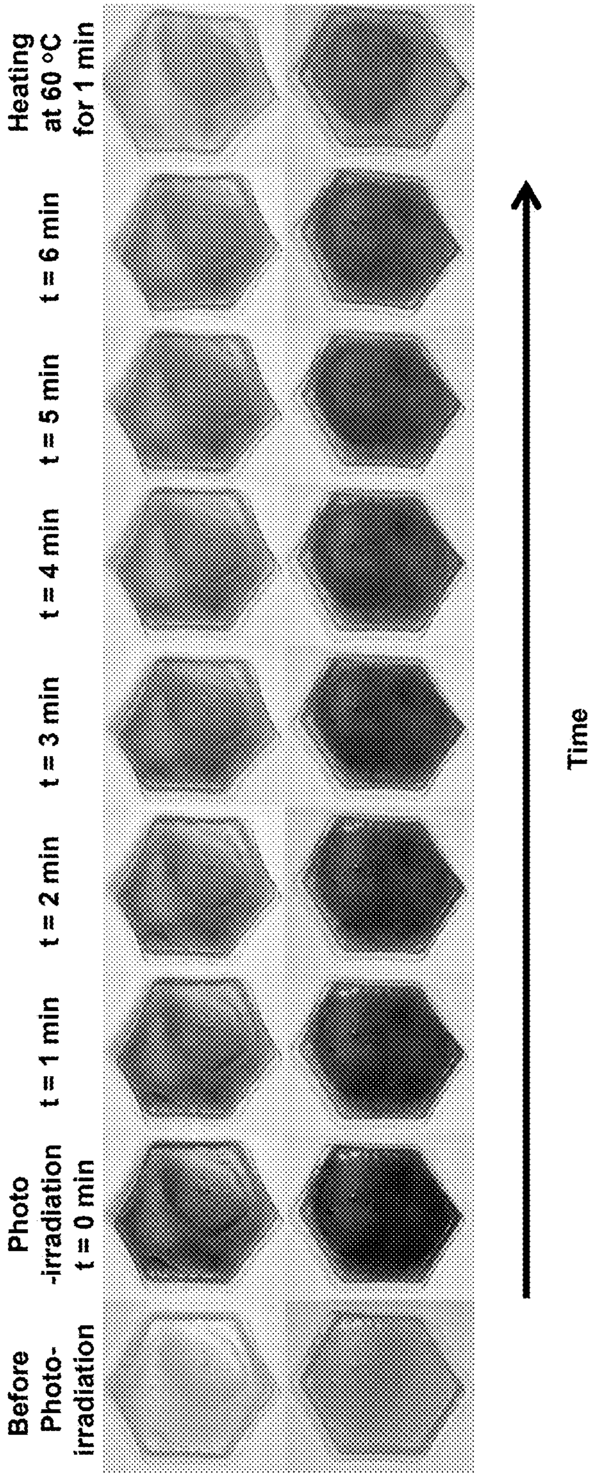
FIGS. 2A-2B show polymer thin-films that contain mixed photochromic naphthopyrans (Nap1+Nap5b) with the ratio of weight percents equal to (FIG. 2A) 2:1 and (FIG. 2B) 5:3 to show a time-dependent multiple color-changing effect at room temperature.

FIG. 2A is a mixture of Nap1 and Nap5b at a ratio of 2:1 while FIG. 2B is at a ratio of 5:3 their photogenerated colored states in solution or to produce polymer thin-film, resulting in multiple color changes at room temperature along with time. After photoirradiation, the solution exhibits color changes from brown, to pale grey, to pale violet, and to colorless eventually at room temperature within three minutes (FIG. 1A). Another example of the solution with different ratios between those compounds to show time-dependent multiple color-changing effect is shown in FIG. 1B. This invention provides multiple photochromic materials that create time-dependent multiple color changes via different thermal decay rates of each colored form at room temperature that commercial photochromic product with a single photoinduced color change cannot provide.

EXAMPLES

EXAMPLE 1: Solution Composition: Two Photochromic Compounds

Using different weight percentages of the mixed photochromic naphthopyran-based compounds, which contain at least one component for each naphthopyran (A) and naphthopyran (B), a photochromic solution with time-dependent multiple color-changing effect was formulated. Formulation 1 contained total 0.5-20 weight % of mixed photochromic compounds including (A): Nap1; (B): Nap2d, Nap3, Nap5a, or Nap5b, with the ratio of weight % between (A) and (B) ranging from 1:9 to 9:1 and PMMA (3-30 weight %), and a chloroform—ethyl acetate solvent mixture (70-97 weight %). The photochromic solutions with time-dependent multiple color-changing effect that have been produced based on the Formulation 1 are depicted in FIGS. 1A and 1B. After photoirradiation, one of the solutions that contains mixed photochromic naphthopyrans (Nap1:Nap5b=2:1), shows color changes from colorless to brown in color. The solution then displays spontaneous multiple color changes from brown, to pale grey, to pale violet, and eventually to colorless at room temperature within three minutes (FIG. 1A).

EXAMPLE 2: Polymer Thin-Film Composition: Two Photochromic Compounds

Photochromic polymer thin-films with time-dependent multiple color-changing effects were produced by a solution including Formulation 1 upon drop-casting onto a plastic substrate. After photoirradiation, one of the polymer thin-film that contains mixed photochromic naphthopyrans (Nap1:Nap5b=2:1), shows color changes from pale yellow to deep brown in color (FIG. 2A), followed by the spontaneous multiple color changes from deep brown, to pale brown, to grey, to pale blue within six minutes at room temperature. The recovery of the original pale yellow color can be realized upon leaving it at room temperature for longer time in the dark or heating it at 60° C. over a minute.

EXAMPLE 3: Thermal Bleaching: Two Photochromic Compounds

Figure 3A:
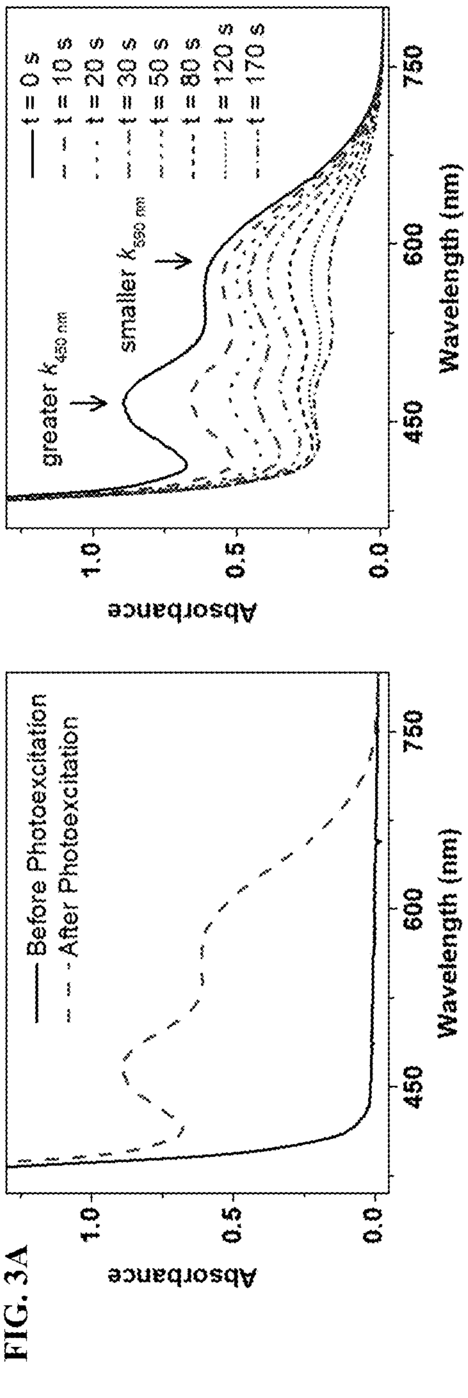
FIGS. 3A-3B show photochromic polymer-containing solutions that contain mixed photochromic naphthopyrans (Nap1+Nap5b) with the ratio of weight percent equal to (FIG. 3A) 2:1 and (FIG. 3B) 5:3 to show time-dependent multiple color-changing effect with the UV-visible absorption spectral changes.
Figure 3B:
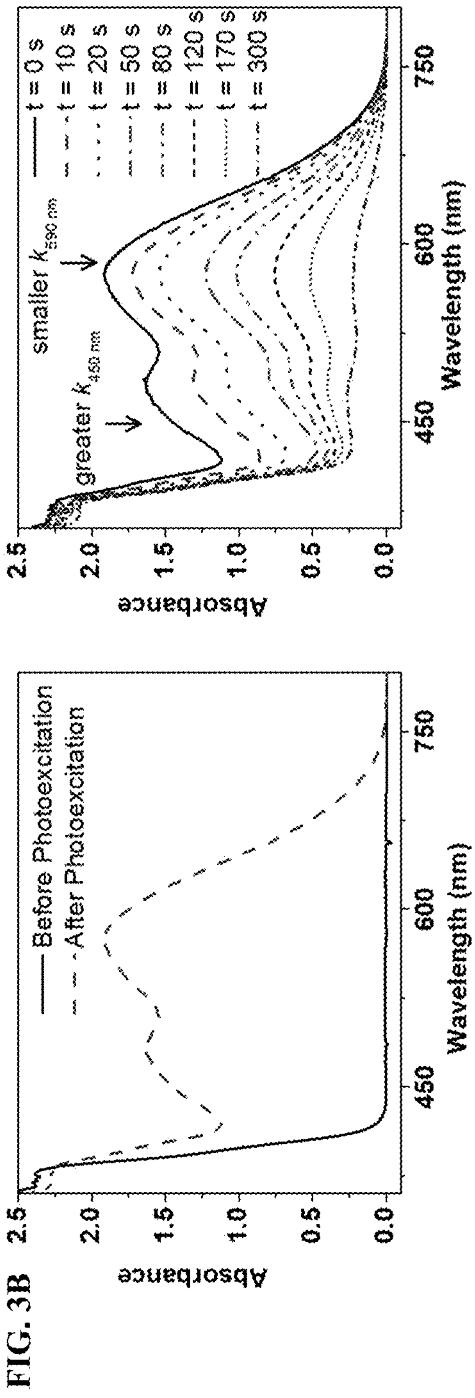
Figure 4A:
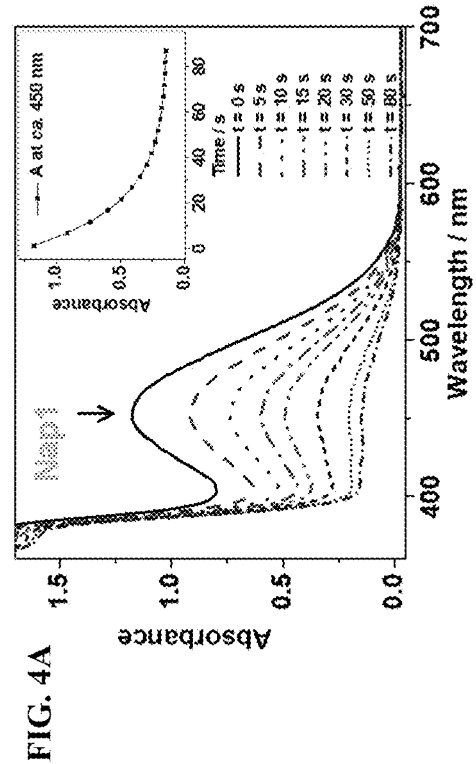
FIGS. 4A-4E show the UV-visible absorption spectral changes of the thermal bleaching of naphthopyran-based compounds (Nap1, Nap2d, Nap3, Nap5a, and Nap5b) at room temperature; the insets show the thermal decay process by monitoring the decline in absorption maximum.
Figure 4B:
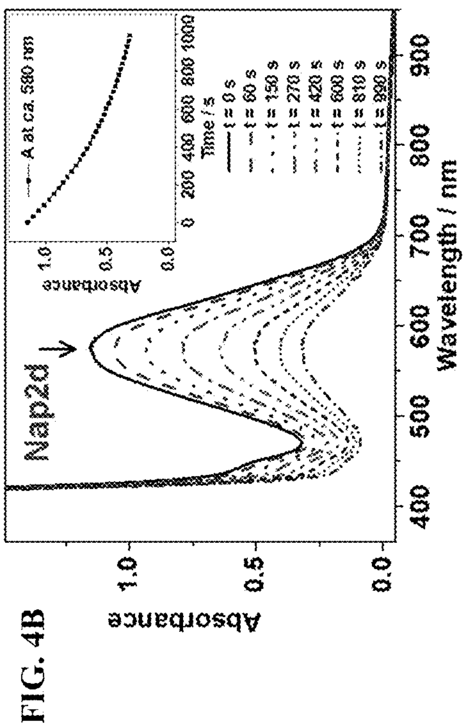
Figure 4C:
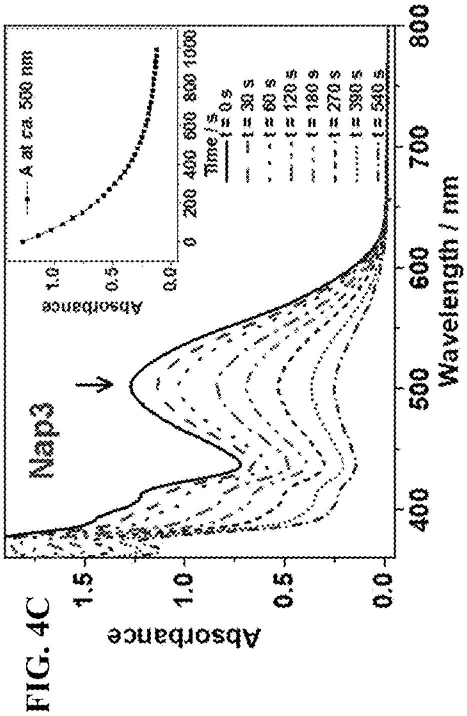
Figure 4D:
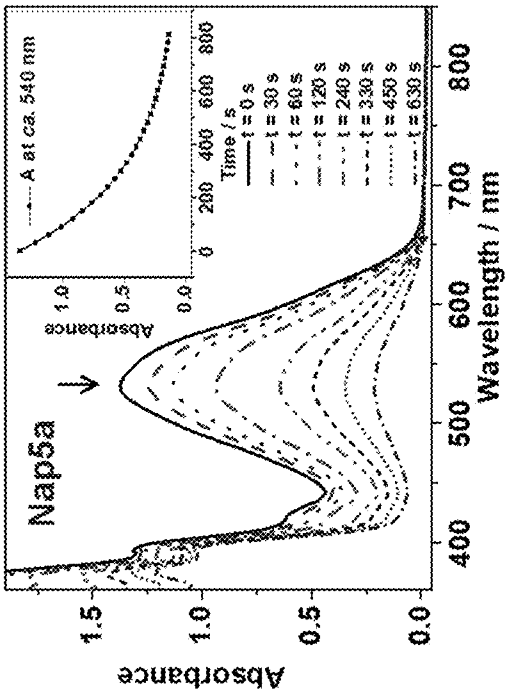
Figure 4E:
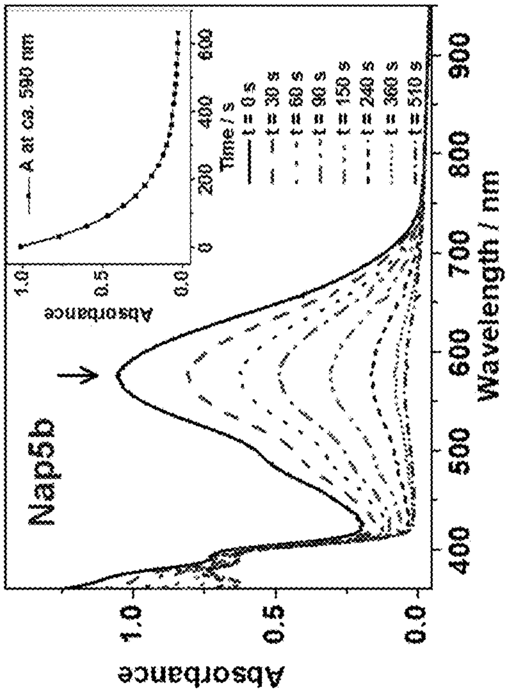
Figure 5:
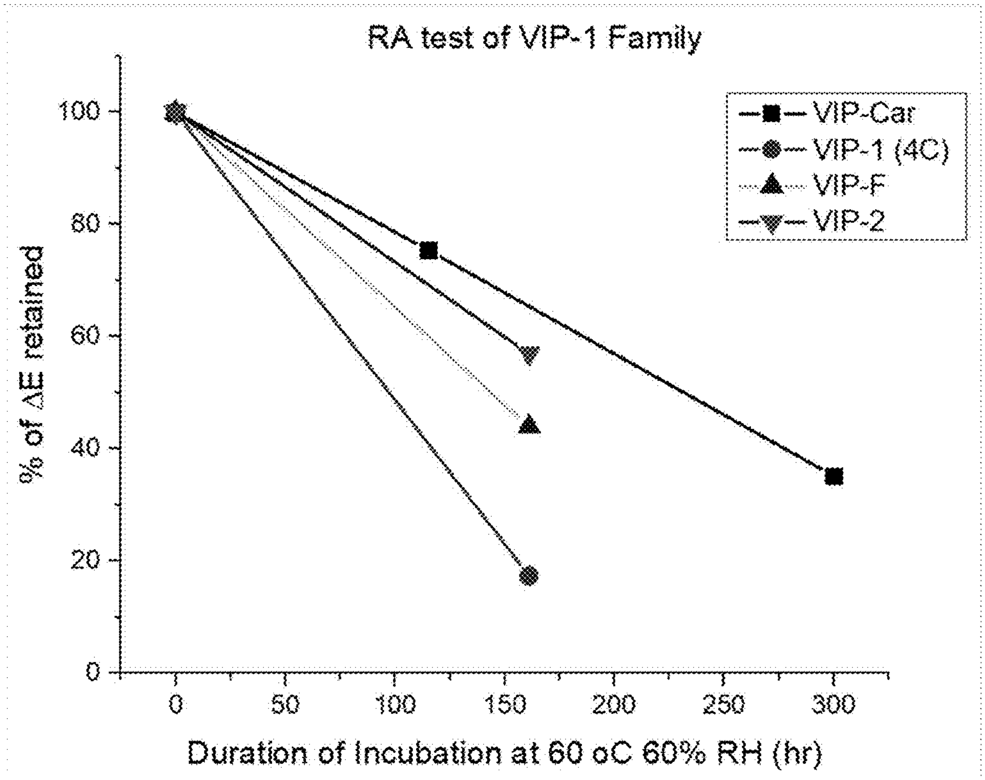
FIG. 5 illustrates the thermal stability of the offset printouts of VIP-based compounds in printing ink at 60° C. over 150 hours.
Figure 6:
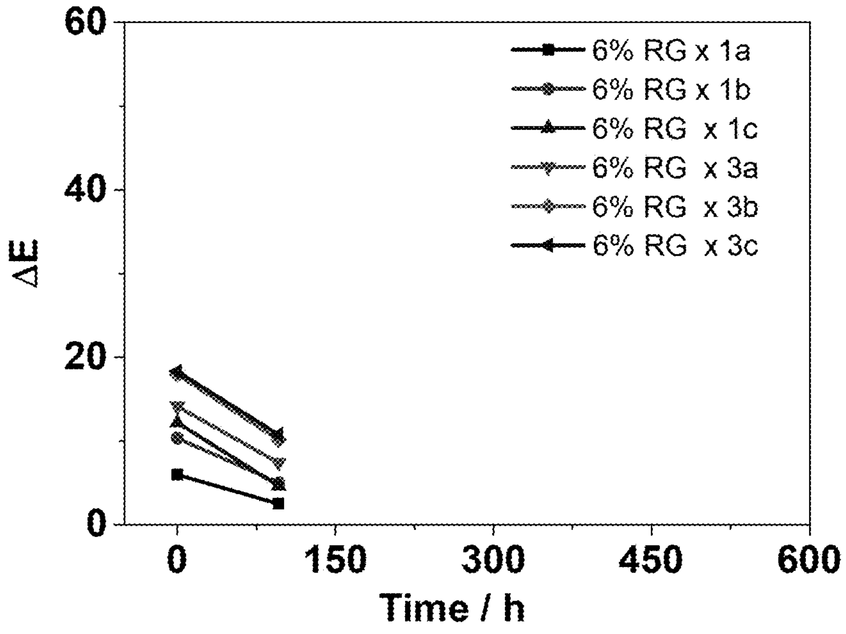
FIG. 6 illustrate the thermal stability of the offset printouts of commercial photochromic compound RG in printing ink at 60° C. over 90 hours.

It is important to mix photochromic naphthopyrans with different thermal decay rate constants, at least one component for each of the structures (A) and (B), to realize a time-dependent multiple color-changing effect. A compound of structure (A), Nap 1, features rapid thermal bleaching with a thermal decay rate constant larger than $1\times10^{-2}$ $s^{-1}$ at room temperature (see FIG. 4 and Table 1), whereas the photochromic naphthopyrans with more $\pi$-conjugated systems in structure (B), Nap2d, Nap3, Nap5a, and Nap5b, show slower thermal bleaching with a thermal decay rate constant smaller than $1\times10^{-2}$ $s^{-1}$ at room temperature. The time-dependent multiple color-changing effect of solutions is depicted for UV-visible absorption spectral changes in FIGS. 3A-3B, in which the colored component at ca. 450 nm displays fast thermal bleaching similar to that of Nap1 ($t_{1/2}$=17 s), whereas the colored component at ca. 590 nm shows slower thermal bleaching similar to that of Nap5b ($t_{1/2}$=86 s).

EXAMPLE 4: Offset Printing Ink Composition: Single Photochromic Compound

Upon using various offset resins and solvents, two more photochromic offset inks were formulated. Formulation 1 contained 0.5-15 weight % photochromic compounds including Nap2d, Nap5a, Nap5b or Nap6a, and resin (30-50 weight %), a mixture of mineral oil, linseed oil, soybean oil, and tung oil (50-70 weight %), polyethylene wax (0.2-1 weight %) and drying agent (0.2-1 weight %). Moreover, Formulation 2 contained the same weight % range of the photochromic compounds as in Formulation 1, and rosin modified phenolic resin (30-50 weight %), soybean oil (50-70 weight %) and additive (0.2-8 weight %). The offset printouts produced based on the Formulations 1 and 2 with 6% Nap5b and 6% Nap2d are depicted in FIGS. 7(*c*) and 7(*a*), respectively. Moreover, the offset printout in FIG. 7(*c*) is based on Formulation 1, whereas the offset printout in FIG. 7(*a*) is based on Formulation 2.

EXAMPLE 5: Screen Printing Ink Composition: Single Photochromic Compound

A photochromic screen printing ink was formulated for producing screen printouts. Formulation 3 contained 0.1-3 weight % photochromic compounds including Nap2d, Nap5a, Nap5b or Nap6a, and a mixture of cyclohexanone, xylene and tung oil (50-70 weight %) and a mixture of resins including phenolic resins (30-50 weight %).

EXAMPLE 6: Inkjet Printing Ink Composition: Single Photochromic Compound

A photochromic inkjet ink was formulated for producing inkjet printouts. Formulation 4 contained 0.1-6 weight % photochromic compounds including Nap2d, Nap5a, Nap5b or Nap6a, and a mixture of ethyl acetate, 2-butanone and diethylene glycol monoethyl ether acetate (94-99.9 weight %).

EXAMPLE 7: Thermal Stability: Single Photochromic Compound

Figure 12:
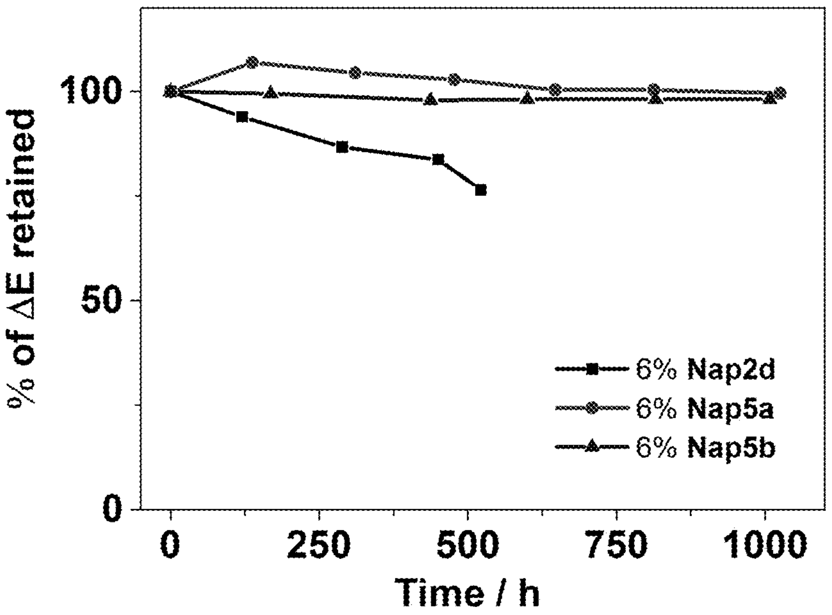
FIG. 12 illustrates the thermal decomposition of the offset printouts of 6% Nap2d, 6% Nap5a and 6% Nap5b in printing ink at 60° C.% ΔE denotes the photoinduced color changing ability of the printouts after storage at 60° C. over a period of time.

Thermal stability of the photochromic ink represents an important property during storages and logistics. The offset printouts based on the photochromic ink in the sixth embodiment were placed into the oven at 60° C. over a period of time. The photoinduced color changing ability (ΔE) of them were investigated in different time interval upon photo irradiation (FIG. 10 and FIG. 11). FIG. 11 shows that negligible thermal decompositions have been observed in the 6% Nap5a and 6% Nap5b offset printouts at high temperature of 60° C. over 1000 hours. 6% Nap5a and 6% Nap5b represent the present compound with R' and R" as the electronic withdrawing group selected from fluoro group which display less than 5% loss of ΔE, while 6% Nap2d is the present compound with R' and R" as the electronic donating group selected from methoxyl moiety to display less than 25% loss of ΔE (FIG. 12).

EXAMPLE 8: Photo-Stability: Single Photochromic Compound

Figure 13A:
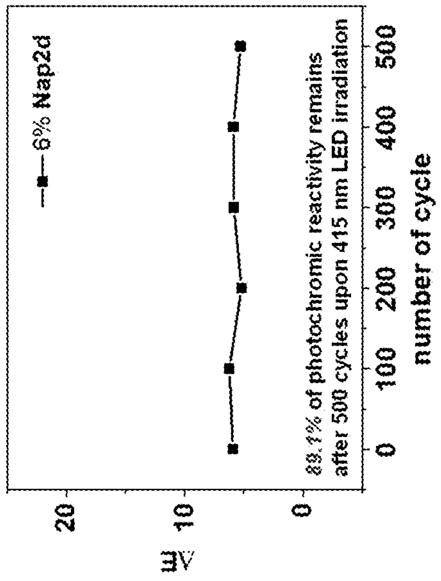
FIG. 13A-13C illustrates the photo-stability of the offset printout of 6% Nap2d (FIG. 13A), 6% Nap5a (FIG. 13B) and 6% Nap5b (FIG. 13C) in printing ink over 500 photo-switching cycles, showing less than 20% photochemical decomposition of the active species.
Figure 13B:
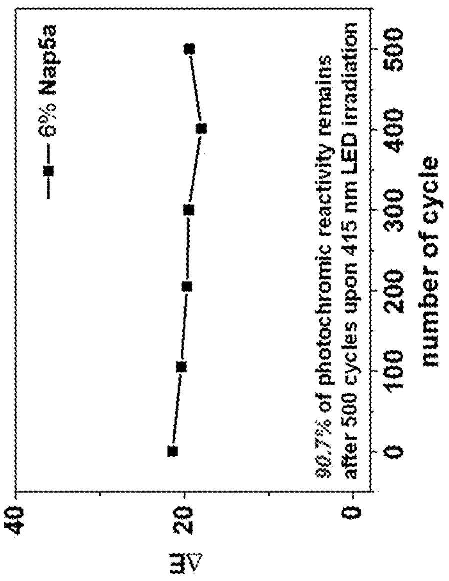
Figure 13C:
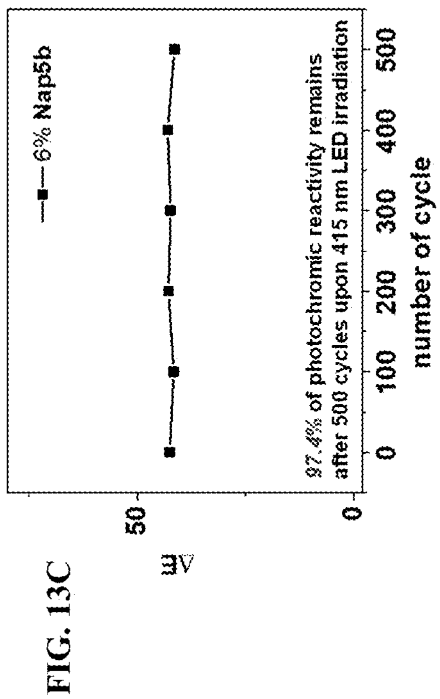

Photo-stability represents another important property of the photochromic ink upon multiple photoswitching cycles. The offset printouts based on the photochromic ink in the ninth embodiment were photoirradited by a photoswitching device with 415nm light-emitting diode (LED), in which the photoirradiation time and the rest time for thermal beaching were set as 40 seconds and 1000 seconds, respectively, during a photoswitching cycle. The photoinduced color changing ability (AF) of them were recorded in each 100 cycles upon photoirradition [FIGS. 13(*a*)-13(*c*)]. FIGS. 13(*a*)-13(*c*) shows that insignificant photochemical decompositions with a loss of around 10% (AF) have been observed in the 6% Nap2d, 6% Nap5a and 6% Nap5b offset printouts over 500 photoswitching cycles upon 415 nm LED irradiation.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A photochromic composition including a first naphthopyran compound having one of the following formulae:

Nap2d

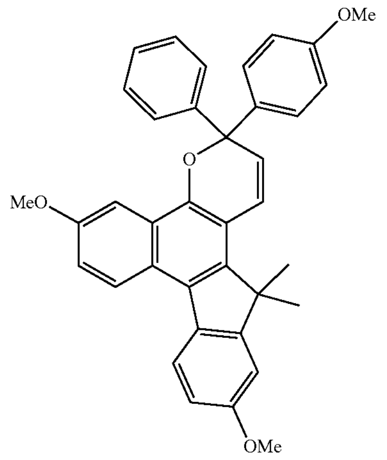

Nap5a

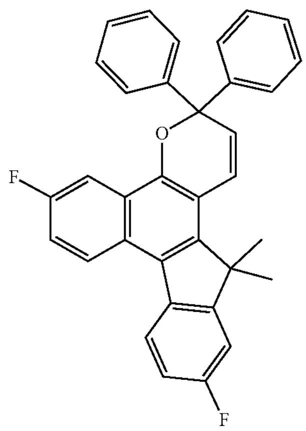

-continued

Nap5b

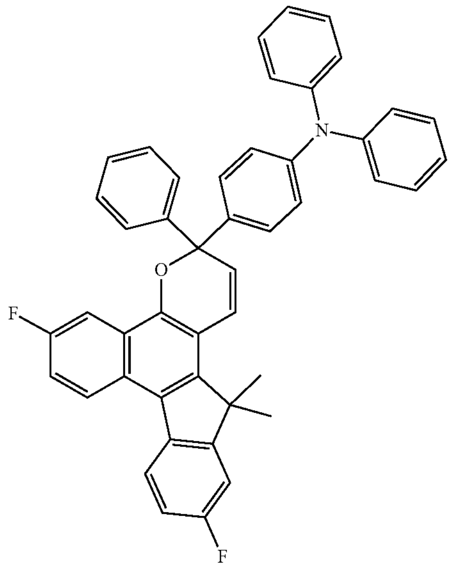

Nap6a

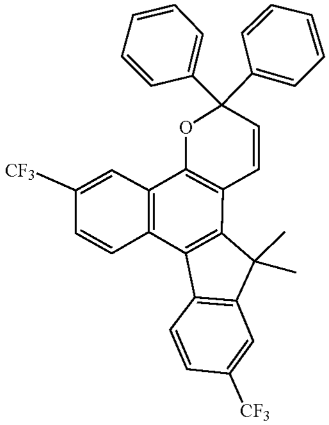

wherein the first naphthopyran compound has a thermal decay rate constant smaller than $1\times10^{-2}$ $s^{-1}$ at room temperature and the photochromic composition is excitable under a visible light range to produce a color change.

2. The photochromic composition of claim 1, wherein the visible light has an intensity of approximately 200 $W/m^2$ or greater at a wavelength of approximately 300-450 nm.

3. The photochromic composition of claim 1, further comprising a second naphthopyran compound having a different excitation wavelength and thermal decay rate constant (k) than the first naphthopyran compound, the second naphthopyran compound having the following formula:

Nap1

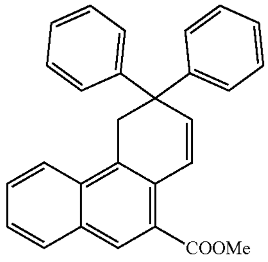

wherein the second naphthopyran compound has a thermal decay rate constant greater than $1\times10^{-2}$ $s^{-1}$ at room temperature; and wherein a ratio by weight percent between the first naphthopyran compound and the second naphthopyran compound ranges from 1:9 to 9:1.

4. A photochromic printing ink selected from an offset ink, screen printing ink or inkjet printing ink, the photochromic printing ink comprising:

the photochromic composition of claim 1 in an amount of approximately 0.1 to 15 weight percent;

one or more polymers/resins in an amount of approximately 3 to 50 weight percent;

one or more additives in an amount from approximately 0 to 8 weight percent; and a solvent in an amount of approximately 50 to 96.5 weight percent.

5. The photochromic printing ink of claim 4, wherein the one or more polymers/resins is/are selected from cellulose, starch, rubber, shellac, rosin modified phenolic resin.

6. The photochromic printing ink of claim 4, wherein the one or more additives is/are selected from waxes, dispersing powder, calcium carbonate, glycerol, ethoxylated or propoxylated fatty alcohols.

7. The photochromic printing ink of claim 4, wherein the solvent is selected from one or more of dichloromethane, esters, ketones, soybean oil, mineral oil, tung oil or linseed oil.

8. A photochromic printing ink selected from an offset ink, screen printing ink or inkjet printing ink, the photochromic printing ink comprising:

the photochromic composition of claim 3 in an amount of approximately 0.5 to 20 weight percent;

one or more polymers/resins in an amount of approximately 3 to 50 weight percent;

one or more additives in an amount from approximately 0 to 8 weight percent; and a solvent in an amount of approximately 50 to 96.5 weight percent.

9. The photochromic printing ink of claim 8, wherein the one or more polymers/resins is/are selected from cellulose, starch, rubber, shellac, rosin modified phenolic resin.

10. The photochromic printing ink of claim 8, wherein the one or more additives is/are selected from waxes, dispersing powder, calcium carbonate, glycerol, ethoxylated or propoxylated fatty alcohols.

11. The photochromic printing ink of claim 8, wherein the solvent is selected from one or more of dichloromethane, esters, ketones, soybean oil, mineral oil, tung oil or linseed oil.

12. A photochromic polymeric material including the photochromic composition of claim 1.

13. The photochromic polymeric material of claim 12, wherein the polymeric material includes one or more polymers selected from polyethylene, polypropylene, polystyrene, polyvinyl chloride, polyamides, polyethylene terephthalate, polytetrafluoroethylene, poly (methyl methacrylate), polyphenylene sulfide, and polyether ether ketone, or rosin-modified phenolic resin.

14. A photochromic polymeric material including the photochromic composition of claim 3.

15. The photochromic polymeric material of claim 14, wherein the polymeric material includes one or more polymers selected from polyethylene, polypropylene, polystyrene, polyvinyl chloride, polyamides, polyethylene terephthalate, polytetrafluoroethylene, poly (methyl methacrylate), polyphenylene sulfide, and polyether ether ketone, or rosin-modified phenolic resin.

* * * * *